June 8, 1943. C. H. WHITE Re. 22,333

DISK HARROW

Original Filed Jan. 8, 1938 4 Sheets-Sheet 1

INVENTOR.
CHARLES H. WHITE

BY
Brown, Jackson, Boettcher & Dienner
ATTORNEYS

June 8, 1943. C. H. WHITE Re. 22,333

DISK HARROW

Original Filed Jan. 8, 1938 4 Sheets-Sheet 2

INVENTOR.
CHARLES H. WHITE

BY
Brown, Jackson, Boettcher & Dienner
ATTORNEYS

June 8, 1943. C. H. WHITE Re. 22,333

DISK HARROW

Original Filed Jan. 8, 1938 4 Sheets-Sheet 3

INVENTOR.
CHARLES H. WHITE

BY
Brown, Jackson, Boettcher & Dienner
ATTORNEYS

June 8, 1943. C. H. WHITE Re. 22,333

DISK HARROW

Original Filed Jan. 8, 1938 4 Sheets-Sheet 4

INVENTOR.
CHARLES H. WHITE

BY
Brown, Jackson, Boettcher & Dienner
ATTORNEYS

Reissued June 8, 1943

Re. 22,333

UNITED STATES PATENT OFFICE 22,333

DISK HARROW

Charles H. White, Moline, Ill., assignor to Deere & Company, Moline, Ill., a corporation of Illinois Original No. 2,264,783, dated December 2, 1941, Serial No. 183,988, January 8, 1938. Application for reissue December 16, 1941, Serial No. 423,221

57 Claims. (Cl. 55—83)

This invention relates generally to agricultural implements and is more particularly concerned with disk harrows of the double action type, although certain features of my invention are also applicable to disk harrows of the single action type.

One of the principal objects of this invention is the provision of a disk harrow having a rigid unitary frame and draft transmitting means pivotally connected to the frame and to the gangs, and in the case of harrows of the double action type, it is also an object of the invention in this connection to provide draft means not only connecting the pivoted draft member with the front gangs but also connecting the front and rear gangs. More specifically, it is an object of this invention to provide a disk harrow having front and rear gangs pivotally connected for generally fore and aft swinging movement with a rigid unitary frame to which a separate draft member is pivotally connected, with suitable draft connections extending between the draft member and the front gangs and between the front and rear gangs.

Another object of the prevent invention is the provision of a disk harrow that is exceptionally flexible and wherein the disk gangs are arranged to have independent generally vertical swinging movement with respect to each other about generally fore and aft extending axes. This feature makes it possible to have sufficient flexibility in the implement to permit the latter to follow the contour of uneven ground, as may be encountered in terraced fields, for example, without having to rely upon looseness in the various connections and without straining the harrow, yet adequately taking care of the lateral thrusts which the gangs impose on the frame of the harrow.

Another object of the present invention is the provision of a disk harrow of the type having a frame wherein the disk gangs are connected to the frame through universal joint means which permit the disk gangs to move freely in various directions to accommodate irregularities in the ground surface while adequately taking care of lateral thrusts involved.

A further object of the present invention is the provision of a disk harrow in which the draft is transmitted to the implement through a draft frame or other means which is pivotally connected with the gangs for generally vertical swinging movement about horizontal transverse pivots. This is especially important in harrows of the double action or other type in which the disk gangs are arranged behind one another, in that arranging the draft frame for vertical swinging effectively prevents any tendency for variations in the height of hitch to cause certain gangs or certain disks in the gangs to run deeper than the others.

An additional object of the present invention is the provision of a disk harrow having front and rear gangs and so arranged that proper registration is secured between the front and rear disks, whether traveling in a straight line or traveling in a curved path. Specifically in this connection it is an object of this invention to provide front and rear disk gangs pivotally connected to a rigid frame to which the draft transmitting means is also pivotally connected and in which the swinging movement of the front gangs is transmitted to the rear gangs at such a ratio as to secure the proper registration at all times.

Still further, another object of this invention is the provision of a disk harrow having front and rear pairs of disk gangs and in which the rear gangs are capable of lateral adjustment toward and away from each other so as to accommodate different speeds of operation and different sizes and shapes of disks.

Still another object of the present invention is the provision of a disk harrow wherein spring means is provided so as to tend to cause the disk gangs to return to their aligned positions, and a further object of this invention is the provision of spring means especially arranged to resist the tendency for the soil reaction against the disks to cause those at one end to run deeper than the others. A further object of my invention in this connection is the provision of leveling springs arranged to prevent certain disks from running deeper than the others with a force that increases in effectiveness with an increase in the operating angle of the disk gangs, thereby compensating for the greater tendency for the gangs to dig in when the operating angle is increased.

These and other objects and advantages of my invention will be apparent to those skilled in the art after a consideration of the following detailed description of the proposed construction which is illustrated in the accompanying drawings.

In the drawings:

Figure 2 is a plan view similar to Figure 1 but showing the disk harrow with the gangs in their angled or operating position;

Figure 1:
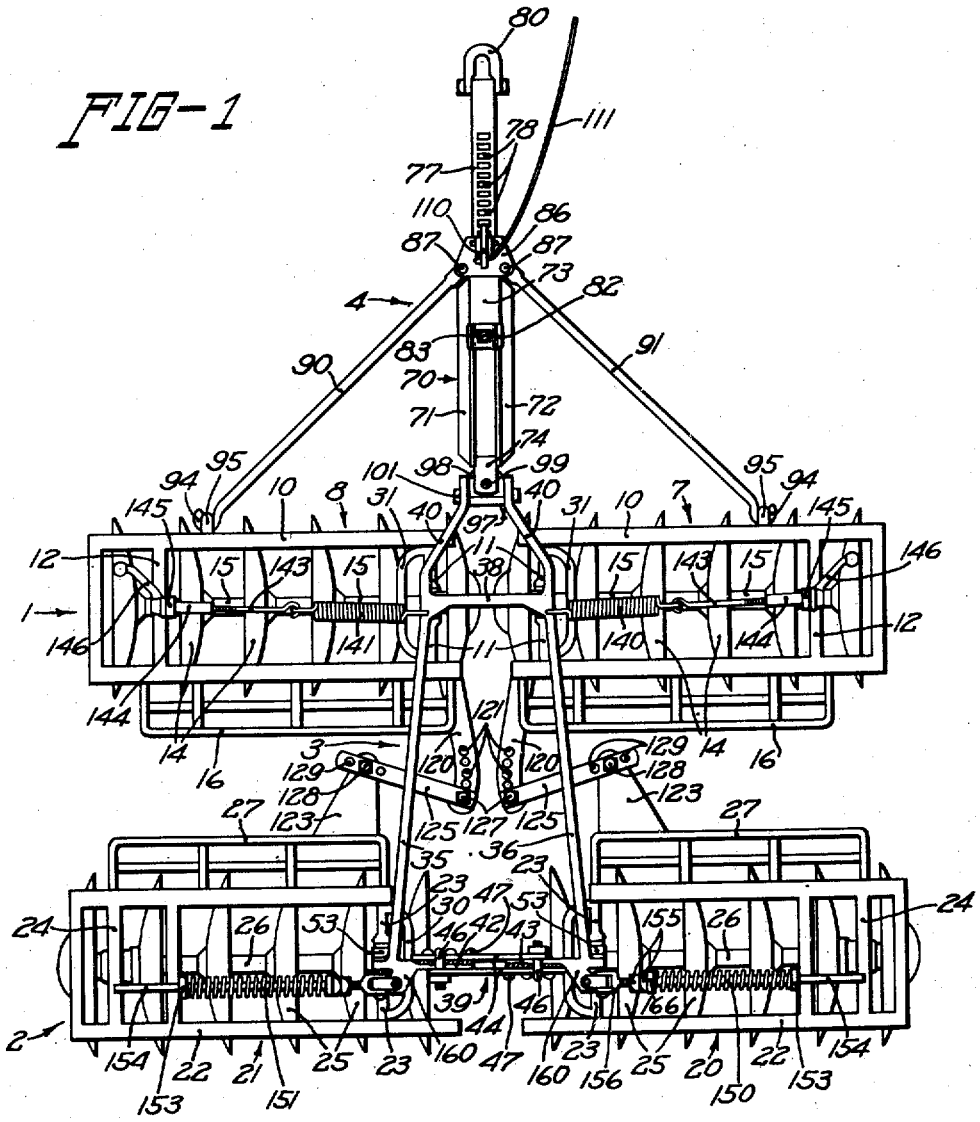
Figure 1 is a plan view of a disk harrow, in transport position, in which the principles of my invention have been embodied.
Figure 8:
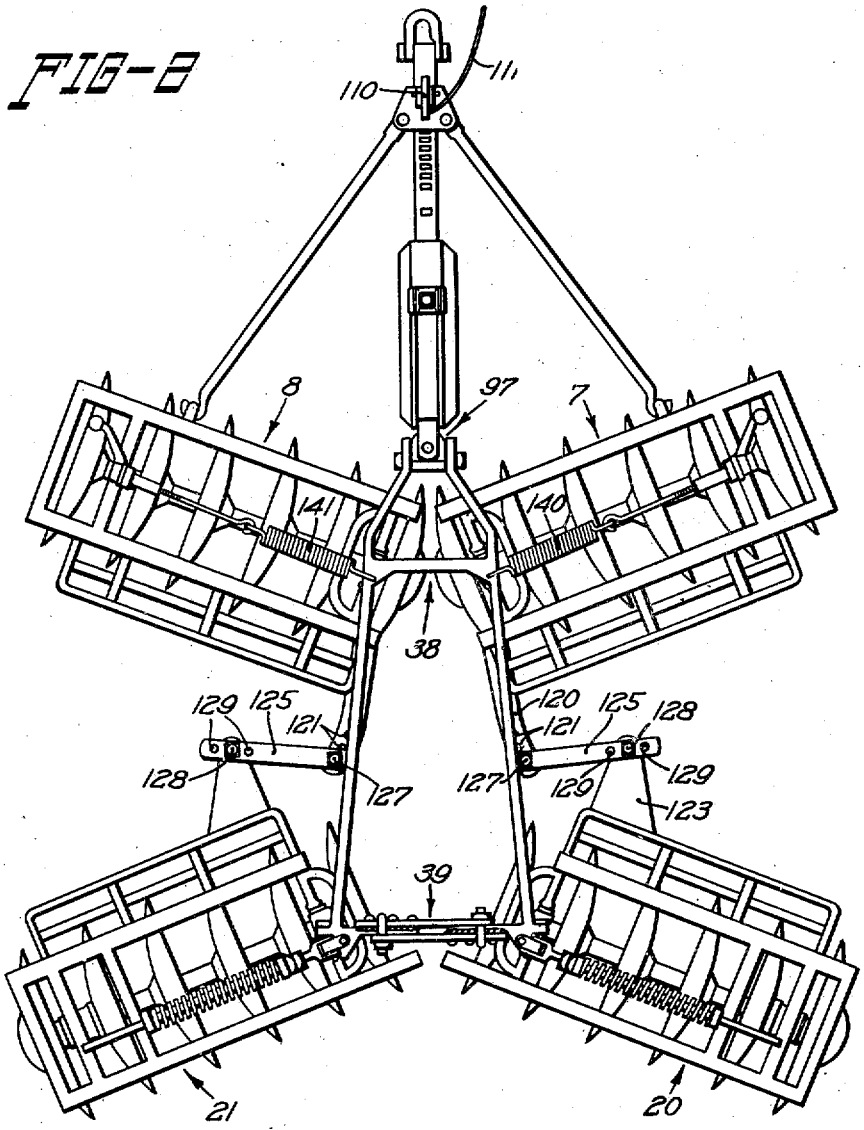

Referring now to the drawings, the disk harrow chosen to illustrate the principles of the present invention comprises a front pair of gangs, indicated by the reference numeral 1, a rear pair of gangs 2, a rigid unitary frame 3, and a draft frame 4.

The front pair of gangs 1 consist of two right and left hand disk gang sections 7 and 8, and each disk gang includes a frame 10 and suitable inner and outer brackets 11 and 12 which carry the bearings in which the disk shaft is journaled for rotation. Disks 14 are mounted on the shaft and are held in proper spaced relation by spools 15. The rear bar of each frame 10 carries a rack 16 to receive weights when it is desired to provide for additional penetration or when operating in unusually hard ground.

The rear pair of gangs 2 is of similar construction, embodying two disk gang sections 20 and 21, each having a frame 22 carrying suitable brackets 23 and 24 receiving the shaft upon which disks 25 are fixed and maintained in spaced apart relation by spacing spools 26. A weight box or rack 27 is fixed to the forward bar of each frame 21. The inner brackets 23 of the rear gangs are connected together by a cross brace 30, and a similar cross brace 31 connects the brackets 11 at the inner ends of the forward gangs 7 and 8.

The frame 3 consists of two generally longitudinally extending frame bars 35 and 36 which are rigidly connected together at or adjacent their ends by transverse members in the form of arches 38 and 39. Secured to the forward arch 38 is a pair of downwardly and forwardly converging members 40 which receive the draft transmitted thereto and which are provided with a number of holes 41 to provide for adjusting the height of hitch as will be referred to later.

The rear arch 39 consists of two members 42 and 43 rigidly secured to or forming a part of the rear ends, respectively, of the frame members 35 and 36. A plate 44 is welded to each of the members 42 and 43 so as to be disposed in overlapping relation, the outer end of each plate 44 having upper and lower apertured ears 45 which receive the ends of a U-bolt 46. Each U-bolt embraces the associated portions of the other plate and arch member, and the opposite plate 44 carries a plurality of lugs 47 which cooperate with the intermediate portion of the associated U-bolt so that when the U-bolts 46 are tightened, the plates 44 and members 42 and 43 constituting the rear arch 39 are firmly fixed together in rigid relation. As will be explained later in detail, the effective width of the frame arch 39 may be adjusted by loosening the U-bolts 46 and bringing the members 42 and 43 closer together or further apart, as desired.

Figure 5:
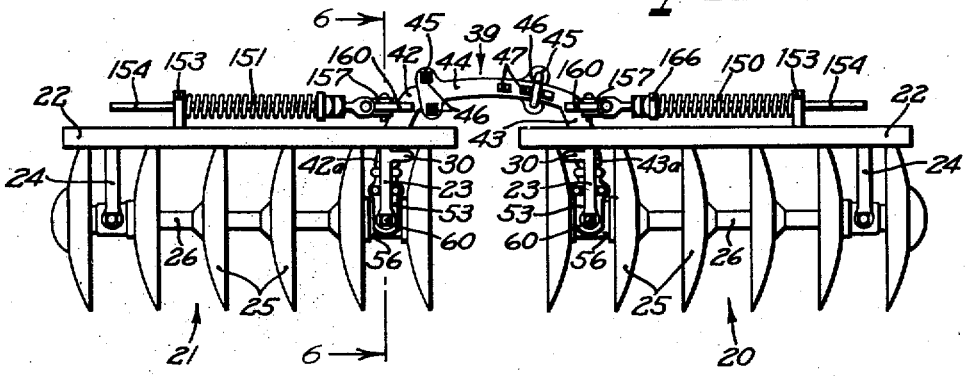
Figure 5 is a rear view looking forwardly and illustrating particularly the leveling springs for the rear gangs and the means for adjusting the rear gangs toward and away from each other.
Figure 6:
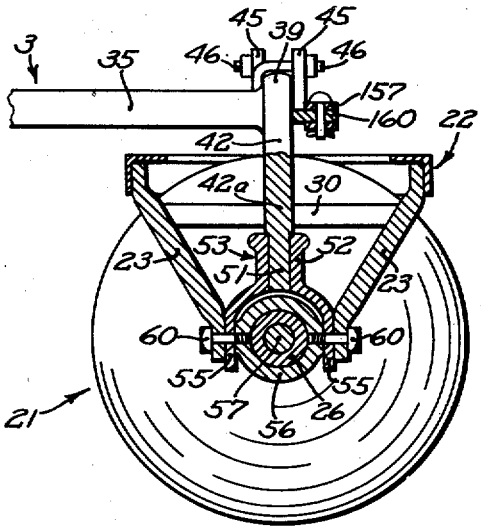
Figure 6 is a sectional view taken along the line 6—6 of Figure 5.

As best shown in Figures 5 and 6, the outer ends of the members 42 and 43 extend downwardly, as at 42a and 43a (Figure 5), and terminate in spindle sections 51 each of which is received in the sleeve portion 52 of a yoke 53 having arms 55 which are pivoted and embrace a bearing sleeve 56. The latter encloses and is supported for rotation on one of the spools 26 which is disposed about the shaft or tie rod 57 which passes through all of the disks and spools of the disk gangs and holds them together for rotation as a unit. The fork ends 55 of the yoke member 53 are received by pivot bolts 60 which pass through the lower ends of the bracket members 23. Since the yoke member 53 can swing about the transverse axis defined by the bolts 60, and since the gang section 21 and yoke member 53 can move or swing fore and aft about the generally vertical axis defined by the spindle end 51 of the frame arch 39, and since the disk unit can rotate about the axis of the shaft or tie bolt 57, it will be seen that the construction just described provides a universal joint connection between the disk gang unit 21 and the frame, the universal joint connection, taken as a whole, permitting movement of the disks about the three axes just mentioned; such axes intersect, as best shown in Figure 6. The other rear disk gang 20 is connected with a universal joint connection with the other end 43 of the frame arch 39 by substantially the same construction, and hence a further description is unnecessary, the same reference numerals being applied for each rear gang.

The front arch 38 of the frame 3 is similar to the rear arch 39 just described except that it is not laterally adjustable. The front arch 38 forms a rigid part of the unitary frame 3 and has downwardly extending ends which are connected to the inner ends of the front disk gangs 7 and 8 by universal joint connections of substantially the same construction shown in Figure 6 and described above. Thus, like the rear gangs 20 and 21, the front gangs 7 and 8 are each connected to the frame 3 by means permitting the gangs to swing either horizontally or vertically about axes at right angle to one another and which axes intersect the axis of rotation of the gang disks, but each pair of gangs is held stable in vertical position by the rigid frame 3 and the other pair of gangs pivoted thereto.

The hitch or draft frame 4 which comprises a draft member or draw bar 70 which includes a pair of laterally spaced angles 71 and 72 which are connected together at their forward ends by upper and lower plates 73. The rear ends of the angles 71 and 72 are fixed to a clevis 74 having upper and lower apertured ends. A tongue 77 is slidably disposed in and projects forwardly from the member 70 and has a plurality of apertures 78 formed therein. At its forward end the tongue 77 carries a clevis 80 for attachment to a tractor or other source of draft. The tongue 77 extends rearwardly between the plates 71 and 72 and at its rear end has a pair of plates 82 secured thereto by a bolt 83.

Figure 3:
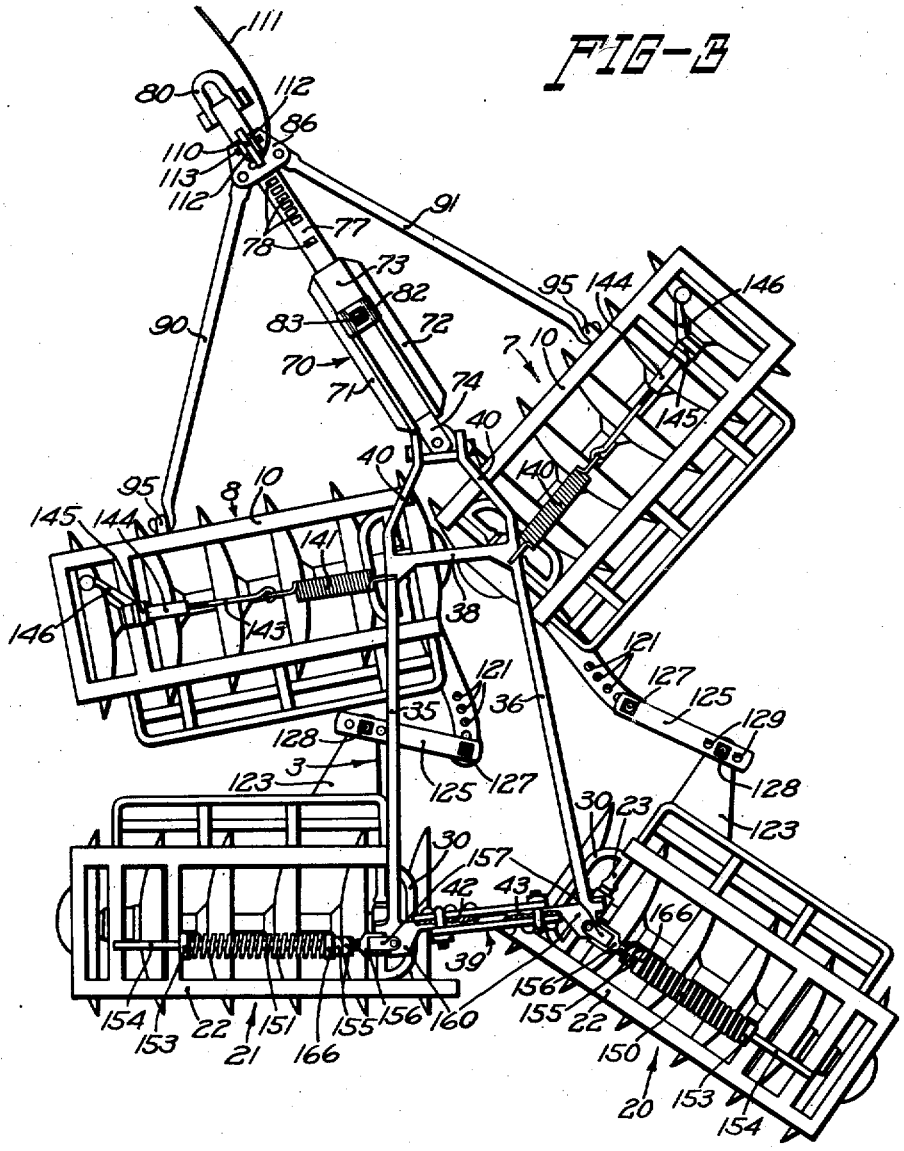
Figure 3 is a plan view of the disk harrow in operating position and when drawn along a curved path.

The tongue 77 is slidable back and forth relative to the draft member 70 and is shown in Figures 1, 2 and 3 in its extreme forward position, with the plates 82 in abutment with the rear ends of the plates 73 through which draft force is transmitted to the implement. The rearward limit of the sliding movement of the tongue 77 is defined by the clevis 74 with which the plates 82 on the rear end of the tongue 77 are adapted to abut.

Figure 4:
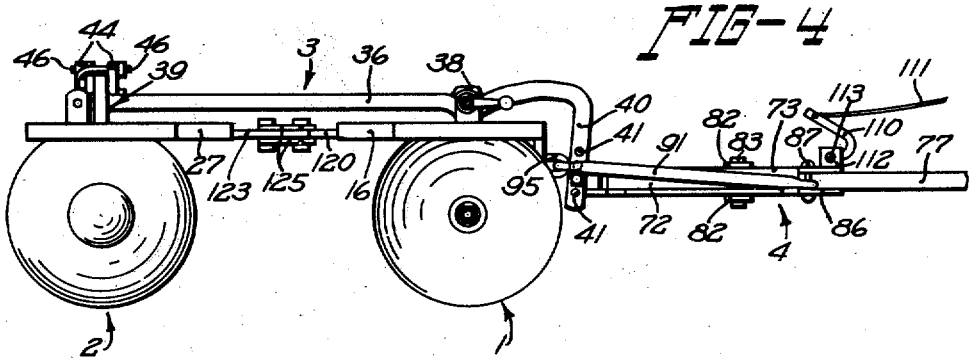
Figure 4 is a side view of the disk harrow shown in Figure 1.

A slide or yoke 86 is disposed about the tongue 77 and carries vertical pivots 87 to which the forward ends of a pair of draft links 90 and 91 are connected. The rear ends of the draft links 90 and 91 are formed with hooks 94 which engage in suitable loops 95 fixed to the forward bars of the front gangs 7 and 8. The hooks 94 and members 95 form universal joint connections between the rearwardly diverging draft links 90 and 91 and the front gangs 7 and 8, and the clevis 74 is connected by universal joint means 97 to the forward ends 40 of the harrow frame 3. The universal joint means 97 includes a pivot block 98 receiving a pin 99 upon which the clevis 74 is pivoted for lateral movement, and the pivot block 98 is connected by means of a horizontal pivot 101 in the form of a bolt or the like disposed in a selected set of openings 41 (Figure 4). Thus, the entire draft frame 4 can swing vertically about generally horizontal transverse axes, or the hitch or draft frame can swing horizontally about the pivot 99 on the frame 3 and the pivots 94, 95 on the front gangs, as illustrated in Figure 3.

Mounted on the slide or yoke 86 is a latch 110 which has an end engageable in any one of the openings 78. A cable 111 extends from the latch 110 to the operator's seat on the tractor. The slide 86 carries a pair of lugs 112, and the latch is mounted on the lug 112 by a pivot bolt 113 or the like. To angle the gangs from their transport position, shown in Figure 1, the tongue 77 is first pushed back to its extreme rearward position, with the plates 82 contacting the clevis 74. This can be done by backing the tractor with the latch 110 disengaged from the tongue 77, as by the operator pulling on the rope 111. Then, if the rope 111 is released, the latch 110 will engage one of the openings 78, and then the tractor can be driven forwardly and will exert a pull through the draft links 90 and 91 against the outer ends of the front gangs 7 and 8, thus pulling the gangs 7 and 8 into angled position until the plates 82 engage the plates 73 on the draft member 70, moving the front gangs into the position shown in Figure 2. If it is not desired that the gangs be angled fully, the tractor need not be backed far enough to push the tongue 77 rearwardly the full extent but only far enough to secure the desired amount of angle. Then by engaging the latch at this point, the subsequent forward movement of the draft will move the gangs into an angled position somewhat less than the angle shown in Figure 2. The amount of angling can be reduced at any time simply by releasing the latch 110. When the latch is released the soil resistance against the disks of the front gangs will cause the gangs to fall back, either to their transport position (Figure 1), or to an intermediate angled position if the latch 110 is reengaged with the tongue 77 before the plates 82 engage the plates 73.

The angle of the rear gangs 20 and 21 is controlled by the angle of the front gangs 7 and 8 through a link connection between the fore and aft gangs at each side on the harrow. An arm 120 is rigidly connected with and extends rearwardly from the inner end of each of the front gangs 7 and 8, and each arm 120 has a plurality of openings 121. Another arm 123 is rigidly fastened to the weight box 27 of each of the rear gangs 20 and 21 and extends forwardly of the harrow in a position laterally outwardly of the arm 120 on the forward gang. A link 125 is connected by pivot bolts to the ends of the associated arms 120 and 123, there being a pivot bolt 127 disposed in one of the openings 121 in the arm 120 and another pivot bolt 128 in one of the several openings 129 formed in the outer end of the link 125, the arm 123 having an opening to receive the pivot bolt 128. As best indicated in Figure 1, the plurality of holes 121 are disposed in an arc about the bolt 128 of the pivot. However, the row of holes 121 in the arms or brackets 120 is not arcuate about the associated bolt 128 when the gangs are arranged for operation in an angled position, as indicated in Figure 2. Thus, the bolts 127 may be placed in the hole 121 that gives the desired angular relation between the front and rear gangs when they are in operating position (Figure 2), but when the gangs are swung back into their transport position, both front and rear pairs of gangs will be aligned, respectively, regardless as to which of the holes 121 receive the bolts 127 (Figure 1).

A plurality of holes 129 are provided in each of the links 125 for the purpose of adjusting the effective lengths of the latter when the rear end of the frame 3 is adjusted in width to move the rear gangs 20, 21 toward or away from each other, in order to insure that the rear gangs are brought into alignment when the harrow is set in its transport position. When the rear gangs are adjusted toward each other from the position shown in the drawings, the bolts 128 should be moved to the inner holes 129, and when the rear gangs are adjusted away from each other from the illustrated position, the bolts 128 should be placed in the outer holes 129. The holes 129 also provide means for adjusting the rear gangs 20, 21 relative to the front gangs 7, 8 in addition to the adjustment provided by the holes 121 in the arms 120. When the bolt 128 at the outer end of each of the links 125 is in the intermediate hole 129, the rear gangs are angled the same extent as the front gangs. By placing the bolt 128 in the inner hole 129, the angle of the rear gangs will be less than the front gangs when the disk harrow is arranged for operation, and by placing the bolt 128 in the outer hole 129 the angle of the rear gangs will be greater than the angle of the front gangs. Adjusting the angle of the rear gangs by this means, however, has the disadvantage that when the bolts 128 are placed in holes 129 other than those corresponding to the adjustment of the width of the rear end of the frame 3, the rear gangs will not return to a position of true axial alignment in transport position.

An important feature of this invention resides in the guiding action of the links 125 and the rear gangs 20 and 21 which, with the action of the rigid frame connection between the gangs, maintains the rear gangs in proper registration with the front gangs during a right or left turn, causing the harrow to turn the soil properly during a straight ahead travel and during turns, as indicated in Figure 3. Maintaining the disks of the front and rear gangs in the proper registration, all of the soil is turned either by the front disks or by the rear disks.

I have found that the registration of this harrow is definitely superior to that of the conventional harrow in which the rear gangs are connected to a rear draft frame which is pivotally connected to a front frame to which the front gangs are connected, thereby providing for horizontal swinging movement of the two rear gangs and rear frame as a unit relative to the front gangs and front frame. The reason for the superior registration of my harrow is that with the articulated type of draft frame last mentioned, the rear gangs tend to follow the line of least resistance by swinging bodily about the frame pivot until the discs in the rear gangs are running in the furrows formed by the front gangs instead of cutting their own furrows intermediate of the front gang furrows. This action is found both in operation on the straight-away and on turns, but is inclined to be more pronounced on turns. In the harrow of my present invention, however, the rigidity of the unitary frame with the link connections between gangs insures that the harrow is held so that the rear gangs cannot swing laterally relative to the front gangs in the manner described, and thus preserves correct registration.

As shown in Figure 3, when making a turn the arm 120 on the outside front gang swings substantially into a straight line relation with the associated link 125. This serves the beneficial purpose of preventing the rear gang on the outside of the turn from angling excessively, whereby the outside gangs, being pivoted to the rigid frame 3, are held in their proper relative position during a turn as well as when operating straight ahead, as in Figure 2.

The disks of the front gangs 7 and 8 face outwardly, and the disks of the rear gangs 20 and 21 face inwardly. In operation when the disks are angled (Figures 2 and 3) the reaction of the pressure against the disks causes the outer disks of the front gangs and the inner disks of the rear gangs to tend to run deeper, or dig into the soil, and to maintain the front and rear gangs level, spring means are connected between the disk gangs and the rigid frame. A pair of tension springs 140 and 141 are connected at their inner ends to the rigid unitary frame 3 at a point slightly to the rear of the front arch 38, the lower ends of which are connected by universal joint means to the inner ends of the front gangs 7 and 8 as described above. The outer ends of the springs are each connected to an adjusting link 143, the outer end of which is threaded into a sleeve 144 which is rotatably disposed in an apertured lug 145 fixed to the gang frame 10 in any suitable manner. A handle 146 is fixed to the outer end of the threaded tube 144, so that by turning the handle 146 the tube 144 can be rotated in one direction or the other to increase or decrease the tension exerted by the associated spring. Since the springs 140 and 141 are anchored to the frame to the rear of the vertical axis defined by the universal joint means connecting the inner ends of the gangs 7 and 8 to the rigid frame 3, the tendency of the springs 140 and 141 is to return the gangs to their transport position (Figure 1) in addition to their effect of exerting a pull on the outer ends of the front gangs so as to resist the tendency of the outer ends to run deeper than the inner ends.

Since the inner ends of the rear gangs tend to dig into the soil and raise the outer ends, compression springs 150 and 151 have been provided and are arranged to act between the rigid frame 3 and the outer ends of the rear gangs 20 and 21. The outer end of each of the springs 150 and 151 bears against a lug or bracket 153 that is welded or otherwise secured in any suitable manner to the gang frame 22. A long rod 154 extends through each of the springs and through the lug 153, and the inner end of each rod 154 is threaded and receives a pair of adjusting nuts 155. The inner end of each of the springs 150 and 151 bears against the adjusting nuts through a suitable washer 156. The inner end of each of the rods 154 inwardly of the threaded portion is formed with a bifurcated section 156 which is apertured and is pivoted to a universal joint block 157 which, in turn, is pivoted about a vertical axis to a lug 160 or some other suitable part on the rigid frame sleeve, preferably on a part of the rear arch 38. As illustrated, the lugs 160 are formed as a part of the frame arms 42 and 43, with the result that when the rear arch 38 is adjusted, the points at which the compression springs are anchored to the rigid frame are correspondingly adjusted. These lugs 160 are, as best shown in Figure 6, also rearwardly of the vertical pivots (see Figure 6) about which the rear gangs 20 and 21 swing generally fore and aft. As a result of this arrangement, the tendency of the springs is not only to swing the gangs into their transport position but also to hold the outer ends down and offset the tendency for the inner ends to run deeper than the outer ends.

Since the upthrust counterbalancing springs 140, 141 and 150, 151 are connected at points spaced longitudinally along the rigid frame with respect to the pivots about which the front and rear gangs swing, these springs exert a force which increases when the angle of the gangs increases and is decreased when the angle of the gangs is decreased. It is well known that the greater the angle of the gangs the greater will be the tendency for one end of the gang to run deeper, or dig in, than the other end. Therefore, arranging the springs in this manner effectively equalizes the pressure between the inner and outer ends of the gangs for any angled position of the gangs.

From the above description it will be apparent that I have provided a novel disk harrow embodying a rigid unitary frame construction that is connected to each of the front and rear gangs and which is provided with a draft member pivotally connected to the frame and with draft connections between the draft member and the front gangs and also between the front and rear gangs. It will also be noted that the draft member and draft connections have universal joint connection with the rigid frame and front gangs and that the gangs themselves have universal joint connection with the rigid frame. As a result of this construction the harrow is exceedingly flexible and can accommodate uneven ground, yet the connections between the various parts are such that the disks are all held in the proper position, even during turns. Also, by virtue of the flexible connection between the hitch and the gangs and their frame, the hitch point may rise and fall without affecting the operation of the gangs themselves. Further, the hitch is connected to the frame in a manner making it possible to adjust the pressures of the front gangs relative to the rear gangs by raising or lowering the connection of the draft member to the rigid frame. The latter is so constructed that the rear gangs can be adjusted toward or away from each other so as to provide for different speeds of operation and for different sizes and shapes of disks, and the leveling springs acting between the rigid frame and the front and rear gangs act to tend to return the gangs to their transport position, thus aiding the straightening of the gangs from their angled position, and in addition the springs are so arranged that their effective force in maintaining the gangs level increases with increased operating angle so as to compensate for the greater tendency of the gangs to dig in when the operating angle is increased.

While I have shown and described above the preferred structure in which the principles of the present invention have been embodied, it is to be understood that my invention is not to be limited to the specific details shown and described, but that, in fact, widely different means may be employed in the greater aspects of my invention.

What I claim, therefore, and desire to secure by Letters Patent is:

1. A disk harrow comprising a unitary rigid frame, two pairs of disk gangs pivotally connected to the rigid frame, a rigid draft member pivotally connected for lateral swinging movement to said rigid frame, rigid draft members pivotally connected at their rear ends to the laterally outer end of the forward gangs, and means connecting the forward ends of said last mentioned rigid draft members to said first mentioned rigid draft member for controlled longitudinal movement relative thereto.

2. A disk harrow comprising a rigid frame, front and rear pairs of disk harrow sections pivotally connected with said frame, a rigid draft member pivotally connected to said frame to transmit draft thereto, rigid draft connections between said front disk sections and said draft member, whereby movement of said rigid draft member in one direction exerts a forward pull on one of said sections and a rearward thrust on the other section, and draft connections between the front and rear disk sections, whereby forward movement of either of said front sections swings the associated rear section in the opposite direction.

3. A disk harrow comprising a rigid frame, a pair of disk gangs pivotally connected at their inner ends to said frame for both fore and aft and generally vertical swinging movement relative thereto, and means for holding said gangs stable.

4. A disk harrow comprising a frame, two pairs of front and rear gangs, universal joint means connecting each of said gangs to said frame, whereby said gangs are capable of both fore and aft and generally vertical swinging movement relative to the frame, a draft member pivoted for lateral swinging movement to the forward end of said frame, links extending laterally and rearwardly and connected to the outer ends of said gangs and accommodating vertical swinging movement thereof, whereby lateral movement of said draft member in either direction and regardless of the vertical position of said front gangs, will swing the latter in the horizontal plane, means actuated by movement of said front gangs in either direction for swinging said rear gangs into and out of angled operating position, and means for holding said gangs stable.

5. A disk harrow comprising a frame, two pairs of disk gangs, universal joint means operatively connecting each gang adjacent its inner end to said frame, a draft transmitting member, universal joint means operatively connecting said draft transmitting member to the forward portion of said frame, means on said draft transmitting member and operatively connected with the outer ends of the forward gangs for swinging said gangs in a generally fore and aft direction about the axes established by said first universal joint means, and means for holding said gangs stable.

6. A disk harrow comprising a frame, front and rear disk gangs, universal joint means connecting each gang to said frame for both fore and aft and vertically swinging movement, draft transmitting means also having universal joint connections with said frame member and the front gangs, and means for holding said gangs stable.

7. A disk harrow comprising a unitary rigid frame, two pairs of front and rear gangs, universal joint means connecting each of said gangs to said frame for both fore and aft and vertical swinging movement, a draft member pivotally connected to said frame, draft connections between the front and rear gangs and between the front gangs and said draft member, and means for holding said gangs stable.

8. A disk harrow comprising frame means, a pair of disk gangs connected to said frame means, and draft transmitting means comprising rigid members pivotally connected to said frame means and said gangs for generally vertical swinging movement about generally horizontal transverse axes and means slidably interconnecting said rigid members to provide for fore and aft movement of said gangs.

9. A disk harrow comprising means serving as a frame having a downturned forward end, a plurality of disk gangs pivotally connected with said frame means for swinging into and out of angled relation, draft transmitting means comprising a rigid member pivotally connected to the forward downturned end of said frame means for generally vertical and horizontal swinging movement relative thereto, and a pair of draft transmitting means pivotally connected at their forward ends with said rigid member and at their rear ends with the outer ends of said gangs for both vertical and horizontal swinging movement in substantially the same horizontal plane as the forward end of said frame means.

10. A disk harrow comprising frame means, two pairs of front and rear gangs connected with said frame means and forming the sole ground engaging supporting means for the disk harrow, draft transmitting means, and means providing for the connection of said draft transmitting means directly to said frame means at any one of a plurality of generally vertically spaced points on said frame means to provide for varying the pressure of the front gangs relative to the rear gangs by varying the height of connection of said draft transmitting means.

11. A disk harrow comprising a rigid unitary frame, two pairs of front and rear gangs pivotally connected to said rigid frame for generally fore and aft swinging movement, the forward portion of said rigid frame terminating in a downwardly extending section having a plurality of generally vertically spaced openings, a draft member adapted to be pivotally connected to said rigid frame member in selected openings, thereby providing for adjusting the pressure of the front gangs relative to the rear gangs, and draft connections between said front and rear gangs and between said front gangs and said draft member.

12. A disk harrow comprising substantially rigid frame means, pairs of front and rear disk gangs, means pivoting the front gangs to said substantially rigid frame means, and laterally adjustable means pivoting the inner ends of each of the rear gangs to said substantially rigid frame means to provide for lateral adjustment of the rear gangs relative to said substantially rigid frame means and toward and away from one another relative to the front gangs to accommodate different speeds of operation, different sizes and shapes of disks and the like.

13. A disk harrow comprising a frame including a pair of generally longitudinally extending frame members, two pairs of front and rear disk gangs, bearing means at opposite ends of said frame members for supporting the frame on the inner ends of said gangs and establishing generally vertical pivots about which said gangs can swing into and out of angled position, and means for adjustably fixing the distance between the rear ends of said longitudinally extending frame members so as to adjustably fix the distance between the rear gangs.

14. In a disk harrow, a unitary rigid frame comprising a pair of generally longitudinally extending members, a forward transverse member secured at its ends to the forward portions of said longitudinally extending members, the latter extending forwardly of said forward transverse member and terminating in downwardly disposed hitch-receiving sections, the portions of said longitudinally extending members rearwardly of said forward transverse member having some flexibility, a pair of rear transverse members rigidly fixed at their outer ends, respectively, to the rear portions of said longitudinal members and movable relative to one another by virtue of the flexibility of said longitudinal member, and clamping means for adjustably fixing said rear transverse members against relative movement to determine the transverse distance between the rear portions of said longitudinally extending members.

15. A disk harrow comprising a frame, a pair of disk gangs pivotally connected with said frame for generally fore and aft swinging movement into and out of transport position, and generally transverse spring means acting against said frame at points spaced longitudinally of the pivot axis of said gangs and against said gangs adjacent the laterally outer portions thereof for urging them toward their transport position.

16. A disk harrow comprising a pair of disk gangs, frame means to which said gangs are pivoted for generally fore and aft movement into and out of angled operating position, and spring means extending between said frame means and said gangs for resisting upthrust of the gangs, said spring means being connected with said frame means at a point spaced from the axes of fore and aft movement of the gangs so that the effective resisting force of the spring means increases generally in proportion to the angular displacement of the gangs from their substantially aligned position.

17. A disk harrow comprising a unitary rigid frame having a forward draft-receiving portion, two pairs of front and rear disk gangs pivotally connected for generally fore and aft swinging movement to the front and rear portions of said frame in laterally spaced relation, a draft member pivotally connected to said front portion of the frame and capable of lateral swinging movement relative thereto, laterally and rearwardly diverging draft connections between said draft member and said front gangs, and operative connections between said front and rear gangs whereby lateral turning movement of said draft member increases the angle between the gangs on the outside of the turn and decreases the angle between the gangs on the inside of the turn so as to maintain the gangs in proper registration.

18. A disk harrow comprising a unitary rigid frame, front and rear pairs of disk gangs pivotally connected at their inner ends to said rigid frame for generally fore and aft swinging movement, a rigid draft member pivoted to the forward end of said frame, draft connections between said draft member and the outer ends of the front gangs, whereby when said rigid draft member is swung laterally, one of said front gangs is pulled forwardly while the other front gang is thrust rearwardly, relative to said frame, and connections between the gangs at each side of the frame whereby when each front gang is swung about its pivot in one direction, the corresponding rear frame is swung about its pivot in the opposite direction.

19. A disk harrow comprising a unitary rigid frame, two pairs of front and rear gangs, universal joint means connecting each gang to said rigid frame means, link means interconnecting said gangs, rigid draft transmitting means connected to said rigid frame and the front gangs by universal joint connections and means for holding said gangs stable.

20. A disk harrow comprising a unitary rigid frame, two pairs of front and rear disk gangs pivoted thereto adjacent their inner ends for generally fore and aft swinging movement, the disks in said front gangs facing outwardly and the disks in the rear gangs facing inwardly, a pair of tension springs connected between said rigid frame and the outer ends of said front gangs to resist the tendency of the outer disks of the front gangs to run deeper than the inner disks, and a pair of compression springs connected between said frame and the outer end of the rear gangs for exerting a thrust against the latter to prevent the inner disks thereof from running deeper than the outer disks.

21. In a disk harrow, a frame comprising generally longitudinally extending members converging downwardly at their forward ends to form a draft receiving frame portion, a pair of front gangs pivoted at their inner ends to said longitudinally extending frame members rearwardly of said draft receiving frame portion, a pair of rear gangs pivoted to the rear ends of said longitudinally extending members, and means comprising a pair of relatively movable parts for adjustably clamping the rear portions of said frame in laterally adjustable spaced relation.

22. A disk harrow comprising a rigid frame, a pair of disk gangs pivotally connected at their inner ends to said frame for both fore and aft and generally vertical swinging movement relative thereto, a draft member pivotally connected to the forward motion of said rigid frame, draft connections from said draft member to the outer ends of said disk gangs, and means for holding the gangs stable.

23. A disk harrow comprising a unitary rigid frame, a pair of front and rear gangs having universal joint connections with said frame adjacent their inner ends, a draft member extending forwardly from said frame, universal joint means connecting the rear end of said draft member to the forward end of said frame, a yoke slidably carried by said draft member, draft transmitting links connected to said yoke at their forward ends and having universal joint connections at their rear ends with the outer ends of the front gangs, said draft member and said links being adapted to have free vertical swinging movement relative to said front gangs and said frame, means adjustably fixing the yoke on said draft member to determine the position of said front gangs relative to said frame, and connections between the front and rear gangs whereby generally fore and aft swinging movement of said front gangs serves to swing said rear gangs generally fore and aft, both said front and rear gangs being capable of generally vertical movement about generally longitudinal axes by virtue of the universal joint connections between said gangs and said frame.

24. A disk harrow comprising a unitary rigid frame having a forward draft-receiving portion, pairs of front and rear disk gangs pivotally connected for generally fore and aft swinging movement to the front and rear portions of said frame in laterally spaced relation, a draft member pivotally connected to said front portion of the frame and capable of lateral swinging movement relative thereto, a pair of rearwardly extending arms fixed, respectively, to the inner ends of said front gangs, laterally outwardly extending links pivoted to the rear ends of said arms, and arms fixed to the inner ends of said rear gangs and pivotally receiving, respectively, the laterally outer ends of said last mentioned links, whereby lateral swinging movement of said draft member relative to said rigid frame serves to swing said front and rear gangs in opposite directions relative to said frame.

25. A disk harrow comprising a pair of disk gangs, means serving as a frame therefor, a draft member pivoted to said frame means for vertical movement, draft connections extending from said draft member to said gangs and pivoted thereto for generally vertical movement, and means for maintaining said gang frames in vertical position.

26. A disk harrow comprising a pair of disk gangs, each having a gang frame and each gang frame comprising front and rear generally transversely disposed frame bars, a rigid draft member pivotally connected with the gang frames for vertical movement relative thereto, rigid draft connections pivoted to the forward bars of said gang frames for vertical movement relative thereto, and means for maintaining said gang frames in vertical position.

27. A disk harrow comprising means serving as a frame having a downturned forward end, a plurality of disk gangs pivotally connected with said frame means for swinging into and out of angled relation, draft transmitting means comprising a rigid member connected to the forward downturned end of said frame means, a pair of draft transmitting means pivotally connected at their forward ends with said rigid member and at their rear ends with the outer ends of said gangs for vertical swinging movement, and means for maintaining said gangs in vertical position.

28. A disk harrow comprising a frame, a pair of disk gangs pivotally connected with said frame for generally fore and aft swinging movement into and out of transport position, and generally transverse spring means acting transversely of the harrow and against said gangs at points spaced longitudinally of their points of pivotal connection with said frame for both holding said gangs level in operation and to urge them toward their transport position.

29. A disk harrow comprising a pair of disk gangs, frame means to which said gangs are pivoted for generally fore and aft movement into and out of angled operating position, and spring means connected between said gangs for resisting upthrust of the gangs, said spring means being connected with said gangs at points spaced generally longitudinally from the axes of fore and aft movement of the gangs so that the effective resisting force of the spring means increases generally in proportion to the angular displacement of the gangs from their substantially aligned position.

30. A disk harrow comprising a unitary rigid frame, two pairs of front and rear disk gangs pivoted thereto adjacent their inner ends for generally fore and aft swinging movement, the disks in one pair of gangs facing outwardly and the disks in the other pair of gangs facing inwardly, a transversely extending tension means connected between the gangs of said one pair to resist the tendency of the outer disks thereof to run deeper than the inner disks, and compression resisting means connected between the gangs of said other pair for exerting a thrust against the latter to prevent the inner disks thereof from running deeper than the outer disks.

31. A disk harrow comprising frame means, pairs of front and rear disk gangs pivotally connected for generally fore and aft swinging movement to said frame means, a draft member pivotally connected to said frame means and capable of lateral swinging movement relative thereto, a pair of generally rearwardly extending arms fixed, respectively, to said front gangs, laterally outwardly extending links pivoted to the rear ends of said arms, and arms fixed to said rear gangs and pivotally receiving, respectively, the laterally outer ends of said last mentioned links, whereby lateral swinging movement of said draft member relative to said rigid frame serves to swing said front and rear gangs in opposite directions relative to said frame.

32. A disk harrow as defined in claim 31, further characterized by said frame means being a substantially rigid structure, either of said first mentioned arms moving substantially into a straight line relation with the associated link when the harrow in angled operating position is drawn along a curved path, as when turning, thereby cooperating with said rigid frame structure to maintain the gangs on the outside of the turn in proper position.

33. A disk harrow comprising a pair of disk gangs connected together in generally axial alignment, the soil pressure acting against the gangs tending to cause upthrust at their inner ends, and generally transversely arranged spring means disposed approximately directly above the axes of the disks of said gangs and acting against the latter for resisting upthrust of the gangs.

34. A disk harrow comprising means serving as a frame, at least one disk gang pivotally connected therewith for generally vertical swinging movement, and yielding means acting transversely against said gang at a point adjacent the outer end thereof and generally above the axis of swinging movement for resisting upthrust of the gang.

35. A disk harrow comprising means serving as a frame, at least one disk gang pivotally connected therewith for generally vertical swinging movement, and yielding means acting generally transversely against said gang and said frame means at a point generally above the axis of swinging movement of the gang for resisting upthrust thereof.

36. A disk harrow comprising a pair of disk gangs connected together in generally axial alignment, the soil pressure acting against the disks of the gangs tending to cause upthrust of the latter, and transversely extending tension means disposed approximately directly above the axes of the disks of the gangs and connected with the latter so as to tend to hold said gangs level and to resist said upthrust, further characterized by said tension means being connected with the outer ends of said gangs to resist upthrust at their inner ends.

37. A disk harrow comprising a pair of generally axially arranged disk gangs arranged for fore and aft swinging movement into and out of transport position, and transverse means acting transversely of the harrow and against said gangs at points spaced from the axes of their pivotal movement so as to tend to hold said gangs level in operation and urge them toward their transport position.

38. A disk harrow comprising a pair of generally axially arranged disk gangs arranged for fore and aft swinging movement into and out of transport position,. and means acting against said gangs at points spaced from the axes of their pivotal movement so as to urge them toward their transport position.

39. A disk harrow comprising a pair of generally axially arranged disk gangs arranged for fore and aft swinging movement into and out of transport position, and means acting against said gangs at points spaced from the axes of their pivotal movement so as to tend to hold said gangs level in operation and urge them toward their transport position.

40. A disk harrow comprising a pair of disk gangs connected together in generally axial alignment for generally fore and aft swinging movement into different angular positions, the soil pressure acting against the disks of the gangs tending to cause upthrust of the latter, and means connected with said gangs to resist upthrust of the gangs with an effective force that increases as the angle between said gangs increases.

41. A disk harrow comprising a pair of disk gangs connected together in generally axial alignment for generally fore and aft swinging movement into different angular positions, the soil pressure acting against the disks of the gangs tending to cause upthrust of the latter, and resilient means connected with said gangs at points spaced from the axis of relative movement of said gangs in both vertical and fore and aft directions, whereby said resilient means tends to resist said upthrust with a force that increases when the angle between said gangs increases.

42. A disk harrow comprising a pair of disk gangs connected together for generally fore and aft swinging movement into and out of generally axial alignment, the soil pressure acting against the disks of the gangs tending to cause upthrust of the latter, and tension spring means extending lengthwise of and acting against the gangs and disposed above and in back of the axis of relative movement of said gangs so as to tend to hold said gangs level in operation and to resist said upthrust with a force that increases when the angle between said gangs increases.

43. In a disk harrow, the combination of two oppositely extending disk gangs, a part connected with each of said disk gangs for movement therewith, a centrally disposed main draft member connecting said parts at their inner ends and including generally upwardly extending spring supporting means and retractile coil springs connected between the said supporting means and outer portions of said parts to exert upward forces on the outer ends thereof and corresponding downward forces at the inner ends thereof.

44. In a disk harrow, the combination of a pair of oppositely extending disk gangs, a draft mechanism including a center member and side members movably connected at their inner ends thereto, the said side members extending outwardly and being connected to the disk gangs for movement therewith, and spring acting mechanism extended angularly from upper portions of said center member to outer portions of the side members for exerting adjustable downward pressure at the inner ends of said side members and connected disk gangs.

45. In a disk harrow, the combination of two oppositely extending disk gangs, means movable with each gang and including a part disposed forwardly of the axis of said gang, means including a centrally disposed main draft member connecting the inner ends of said parts, and retractile coil springs connected between said main draft member and outer portions of said parts and so arranged as to exert upward forces on the outer ends thereof and corresponding downward forces at the inner ends thereof.

46. In a disk harrow, the combination of two oppositely extending disk gangs, frame members connected to the disk gangs for movement therewith, a centrally disposed main draft member connecting the frame members at their inner ends, and retractile coil springs connected between said main draft member and outer portions of the frame members to exert upward forces on the outer ends of the frame members and corresponding downward forces at the inner ends thereof.

47. In a disk harrow, the combination comprising central draft means, a pair of disk gangs arranged in outwardly and oppositely extending relation, frame members connected to the gangs and pivotally connected at inner ends on substantially vertical axes, said central draft means having spring receiving means disposed approximately vertically above the axes of swinging of said gangs, and a separate spring extending between said spring receiving means and the frame member of each gang for exerting forces on said frame members to counteract generally vertically acting thrust at the center of said disk gangs.

48. In a disk harrow, the combination comprising central draft means, a pair of disk gangs arranged in outwardly and oppositely extending and manually reacting relation, frame members connected to the gangs and pivotally connected at inner ends on substantially vertical axes, said central draft means having spring receiving means disposed approximately vertically above the axes of swinging of said gangs, and a separate retractile coil spring stretched between said spring receiving means and the frame members of each gang for exerting upward forces on outer ends of the frame members and thereby counteracting upward thrust at the center caused by reaction of the disk gangs.

49. In a disk harrow, the combination comprising central draft means, a pair of disk gangs arranged in outwardly and oppositely extending relation, frame members connected to the gangs and pivotally connected at inner ends on substantially vertical axes, said central draft means having spring receiving means disposed approximately vertically above the axes of swinging of said gangs, and a separate coil spring stressed between said spring receiving means and the frame member of each gang for exerting downward forces on the outer ends of the frame members and thereby counteracting downward thrust at the center of the disk gangs.

50. A disk harrow comprising means serving as a draft transmitting frame, a pair of oppositely extending disk gangs, gang members connected to the disk gangs and extending lengthwise with respect thereto, means pivotally connecting said gang members for generally vertical swinging movement relative to said draft transmitting frame, and yielding means comprising two spring means acting at their inner ends against said draft transmitting frame and disposed generally transversely and acting at their outer ends against said gang members for resisting upthrust thereof.

51. A tandem disk harrow comprising front and rear pairs of outwardly spread and oppositely acting disk gangs having frame parts extending parallel with their respective axes, spring-receiving parts on the frame parts of the forward gangs, spring means connected to the upper ends of said parts to exert downward forces on inner ends of the front gangs, and spring means for exerting downward forces on outer ends of the rear gangs.

52. A disk harrow comprising a pair of front disk gangs pivotally connected adjacent their inner ends for generally fore and aft swinging movement and for limited vertical swinging movement, a pair of rear disk gangs pivoted adjacent their inner ends for generally fore and aft swinging movement and for limited vertical swinging movement, the disks in one pair of gangs facing outwardly and the disks in the other pair of gangs facing inwardly, a transversely extending tension means connected between the gangs of said one pair to resist the tendency of the outer disks thereof to run deeper than the inner disks, and compression resisting means connected between the gangs of said other pair for exerting a thrust against the latter to prevent the inner disks thereof from running deeper than the outer disks.

53. A disk harrow comprising frame means, a pair of disk gangs connected with said frame means for generally vertical swinging movement, brackets fixed to said frame means at points thereon spaced from the axes of vertical swinging movement of said gangs relative to said frame means, and transversely disposed spring means reacting at their inner ends against said brackets for resisting vertical swinging of said gangs.

54. A disk harrow comprising a pair of disk gangs connected together for generally vertical swinging movement and for generally fore and aft swinging movement, each gang having a member swingable at least generally fore and aft therewith, a bracket fixed to each member, and transverse spring means disposed substantially above the axis of fore and aft movement of said gang members and connected with said brackets for resisting displacement of said gangs about the axis of vertical swinging movement in all working positions of the gangs.

55. A disk harrow comprising a pair of disk gangs connected together for generally vertical swinging movement and for generally fore and aft swinging movement, each gang having a member swingable at least generally fore and aft therewith about a generally vertical axis, a bracket fixed to each member, and transverse spring means disposed substantially above said axis and connected with said brackets for resisting displacement of said gangs about the axis of vertical swinging movement in all working positions of the gangs.

56. A disk harrow comprising a pair of disk gangs connected together for generally vertical swinging movement, each gang having a member swingable therewith, means for transmitting draft to the inner ends of said gangs and including a part with which said members are pivoted for generally fore and aft swinging movement about a pair of generally laterally spaced axes, a bracket fixed to each member and swingable therewith, and transverse spring means disposed substantially above said axes and connected with said brackets for resisting displacement of said gangs about the axis of vertical swinging movement in all working positions of the gangs.

57. A disk harrow comprising a pair of disk gangs, means for applying draft to the gangs, the latter being pivotally connected with said means for generally vertical swinging movement about one or more axes, a bracket fixed to each gang, and spring biased rod means disposed transversely of the harrow and connected with said brackets so as to resist displacement of said gangs about said one or more axes.

CHARLES H. WHITE.